April 27, 1965
R. R. BOWER
3,180,968
WELDING
Filed Dec. 26, 1961
2 Sheets-Sheet 1
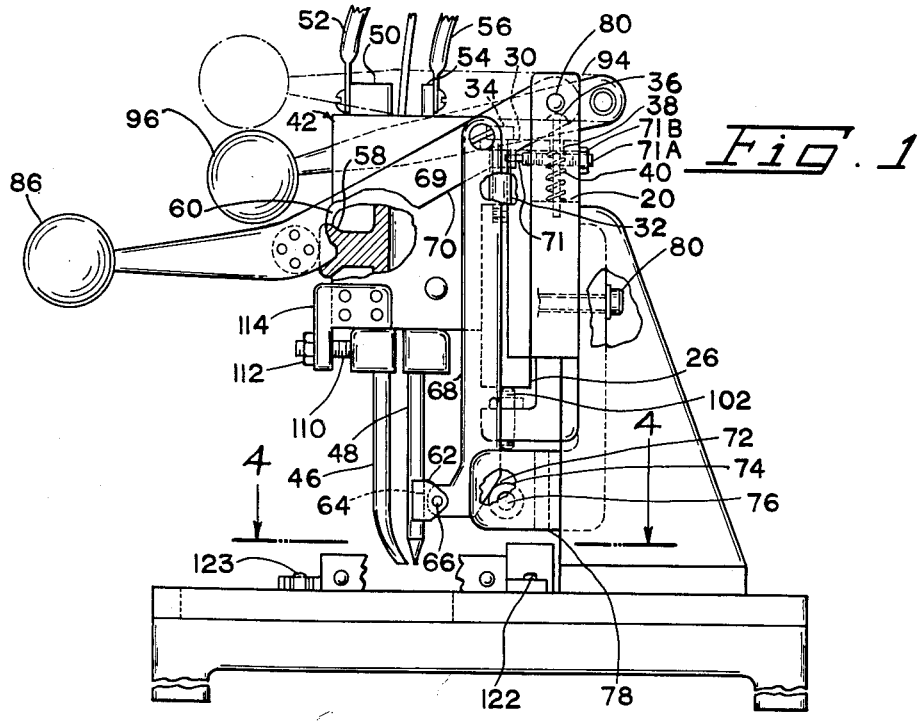
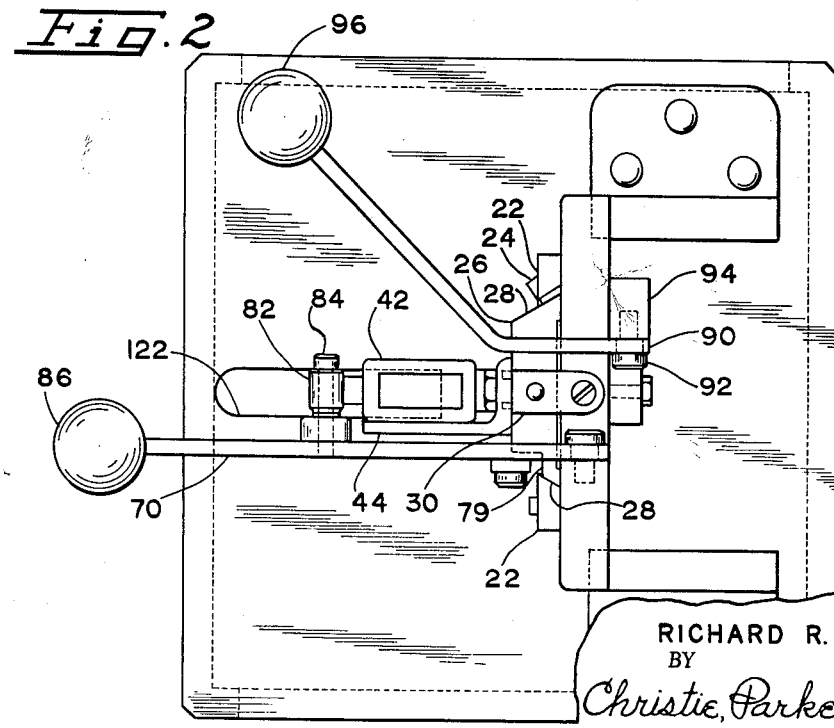
INVENTOR.
RICHARD R. BOWER
BY
Christie, Parker & Hale
ATTORNEYS

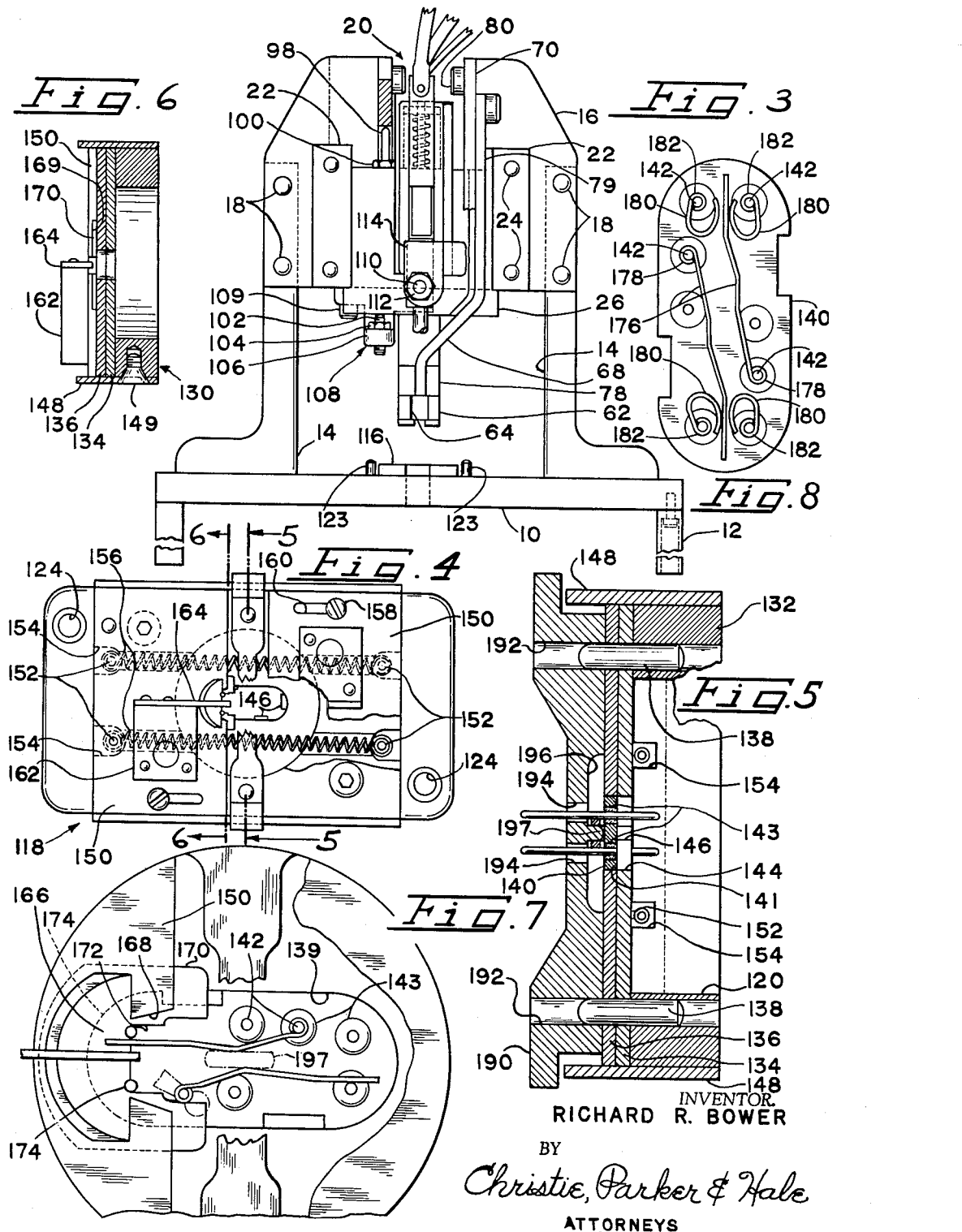

United States Patent Office 3,180,968
Patented Apr. 27, 1965

3,180,968
WELDING
Richard R. Bower, Palo Alto, Calif., assignor to Raytheon
Company, Lexington, Mass., a corporation of Delaware
Filed Dec. 26, 1961, Ser. No. 161,873
2 Claims. (Cl. 219—78)

This invention relates to improvements in spot welding.

One important application of the improved spot welding technique of this invention is welding flexible metal loops around metal posts or electrodes. For example, in the manufacture of small relays, switch armatures are made in the form of elongated flexible springs with a loop at one end of the spring. The loop is disposed around a metal post and bonded to it. The other end of the armature terminates adjacent a coiled spring which has a loop formed in one end to fit around a post.

Prior to this invention, the industry thought that spot welding of the metal loops to the metal posts was impractical because good electrical contact did not seem possible. Ordinarily, in spot welding two pieces of work together, a pair of electrodes are caused to bear against opposite surfaces of the two pieces and force them together. The contact between the two pieces provides a path of high resistance so that current flowing through the electrodes and the two pieces at the point of contact causes the pieces to fuse and weld together.

With the metal loops disposed substantially entirely around metal posts, it is difficult to effect good contact between a post and one electrode and the metal loop and the other electrode. Attempts to contact the end of the post with one electrode, and to contact the outside of the loop with the other electrode resulted in unreliable welds. Prior to this invention, it was thought that contacting the outside of the loop with the electrodes on opposie sides of the post would not work because the loop would short the current between the two electrodes and prevent sufficient current from crossing the points of contact between the loop and post to effect a weld. This has proved to be the case, unless good contact is made by the electrodes against the loop. As a consequence, the loops have been soldered to the posts instead of spot welded. Soldering has the disadvantage that it is messy, not as strong as spot welding, and is not able to withstand temperature as high as spot welding.

This invention provides a welder for spot welding a loop to a post by causing the electrodes to make proper contact with the outside surface of the loop and squeeze it against the post.

In terms of method, the invention welds a strip to a post by disposing the strip around the post and contacting the outside of the strip with a pair of welding electrodes. The strip is forced by the electrodes to make firm contact against the post. Thereafter, electric current is passed from the electrodes through the strip and post to weld them together.

In the preferred form of the invention, the electrodes are moved toward each other with respect to the strip and the post to insure good electrical contact, even though the strip may make a loose fit around the post.

In terms of apparatus, the welder includes a pair of spaced electrodes. Means are provided for holding two parts between the electrodes. Means are also provided for moving each of the electrodes toward each other with respect to the parts to force the parts into firm contact with each other. Means are also provided for passing electrical current through the electrodes to weld the parts together.

In the preferred form, the welder includes a frame and a welding head mounted to slide on the frame. The electrodes are mounted on the head. Preferably, a pad is disposed to be in contact with one of the electrodes adjacent its working end, and means are provided for pushing the pad against the electrode to urge it toward one side of the work while the other electrode is urged toward the work from the opposite direction.

In welding a loop to a post, it is often important that the loop be held in the proper position during the welding operation. This invention provides apparatus for holding loops and posts in proper orientation while they are spot welded together. The apparatus includes a body having a recess in its surface to receive and hold a post. Elongated guide means are mounted on the body, and a slidable plate is mounted on the guide means to be movable between a first and second position with respect to the body. Turning means is mounted on the plate to extend toward the loop and engage and push it to a desired welding position when the plate is moved from the first to a second position.

Preferably, the plate carries a shim which fits under the loop to space the loop properly along the longitudinal axis of the post.

In one form, the plate is a bridge which moves toward and away from the surface of the body so that turning means on the bridge engages the strip.

In another form, the apparatus includes a pair of plates mounted to slide along the surface of the body, and the plates are urged toward each other by spring means. Preferably, each of the plates carries a shim extending toward a respective post and arranged to fit under a loop to support it in proper position. Turning means are mounted on the plate above the shims to engage the strips and move them to a welding position.

These and other aspects of the invention will be more fully understood from the following detailed description and the accompanying drawings in which:

FIG. 1 is a right side elevation, partly broken away, of the presently preferred embodiment of the welder;

FIG. 2 is a fragmentary plan view of the welder shown in FIG. 1;

FIG. 3 is a fragmentary front elevation, partly broken away, of the welder shown in FIG. 1;

FIG. 4 is a view taken on line 4—4 of FIG. 1 showing the work-holding apparatus;

FIG. 5 is a view taken on line 5—5 of FIG. 4;

FIG. 6 is a view taken on line 6—6 of FIG. 4;

FIG. 7 is an enlarged view taken in the area enclosed by the circle 7—7 of FIG. 4; and FIG. 8 is a fragmentary elevation of a relay header with two armatures and four contact springs welded in place on respective posts.

Referring to FIGS. 1, 2, and 3, the welder includes a horizontal base 10 which is mounted on a pair of downwardly extending support walls 12.

A pair of upwardly extending support legs 14 are mounted on top of the base. A vertical cross plate 16 is secured by bolts 18 to the upper ends of the support legs, and includes in its central portion an upwardly opening notch 20.

A pair of vertical guide strips 22 are secured by bolts 24 to the forward face of the cross plate on opposite sides of the notch 20. As shown best in FIG. 2, the inner edge of each guide strip slopes rearwardly and outwardly to form a dovetail joint which receives a slide block 26 with outwardly and rearwardly inclined surfaces 28 on each edge to make a sliding fit between the vertical guide strips. The forward end of a horizontal lifting finger 30 is disposed on the upper end of a vertical sleeve 32. The lower end of which rests on the upper edge of the slide block. A bolt 34 extends down through the lifting finger and the sleeve 32, and is threaded into the upper end of the slide block to hold the finger and sleeve firmly in place. A vertical bolt 36 extends down through an opening 38 in the rear end of the lifting finger, and down through a compression spring 40, which rests on the bottom of the notch formed in the cross plate. The lower end of the bolt 36 is threaded into the cross plate. Thus, the compression spring 40 supports the slide block and urges it upwardly until the lift finger engages the head of the bolt 36.

A welding head 42 is secured by an L-shaped head bracket 44 to the forward face of the slide block. The welding head is a modified conventional tweezer electrode type, and carries a forward electrode 46 and a rear electrode 48. The forward electrode is secured at its upper end to a terminal block 50, and is supplied power through a cable 52 from a conventional source (not shown). The rear electrode is secured at its upper end to a terminal 54 and is supplied power through a cable 56 also connected to the power source.

As shown in the broken away portion of the welding head in FIG. 1, the forward electrode is modified to include a button 58 which extends forwardly through an opening 60 in the front end of the welding head. The central portion of the forward electrode is in the form of a relatively stiff leaf spring so that the lower end of the forward electrode can be deflected rearwardly toward the rear electrode by applying pressure to the forward end of the button 58. In the conventional tweezer electrode welder, the rear electrode is unsupported at its lower end, and made relatively stiff. For many types of welding operations this arrangement is satisfactory, but for welding a loop around a post, it is better to provide means for urging the tip of the rear electrode forwardly toward the work and forward electrode at the same time the forward electrode is forced to the rear. To this end, a pressure pad 62 is disposed against the rear side of the rear electrode and is located near the lower end of the electrode. The forward face of the pad includes a vertical semi-circular groove 64 which cradles the rear portion of the rear electrode. The rear end of the pad is connected by horizontal transverse pivot pin 66 to the lower end of the upright link 68, the upper end of which is attached to the intermediate portion of a downwardly and forwardly extending switch lever 70. The downward travel of the switch lever is directed by a horizontal dowel 71 press-fitted into the rear of the lever to bear against the forward end of a stop screw 71A threaded through the cross plate and held in place by a jam nut 71B. The rear edge of the lower end of the link 68 includes a downwardly and forwardly inclined cam surface 72 which rides on a roller 74 mounted on a horizontal and transverse shaft 76 secured in the lower end of an L-shaped bracket 78 mounted by a bolt 80 on the back of the cross plate 16. As shown best in FIG. 3, the link 68 extends down a vertical recessed portion 79 in the right side of the slide block and is offset near its lower end to extend down over the roller 74. Thus, as the link is forced down, the inclined surface 72 rides on the roller 74 to force the pressure pad and rear electrode forwardly. The rear electrode is relatively stiff, but it has sufficient flexibility to permit a slight deflection in the forward direction. Preferably the pad is made of a suitable electrical insulating material such as a phenolic plastic sold under the tradename "Bakelite."

The upper end of the switch lever is secured by horizontal pivot pin 80 to the cross plate 16 at the upper end of the right side (as viewed in FIG. 3) of the notch 20.

A switch roller 82 is mounted on a horizontal transverse shaft 84 in the intermediate portion of the switch lever to ride against the control button 58. A ball handle 86 is secured to the forward end of the switch lever. Thus, when the ball handle 86 is pushed down, the roller 82 forces the control button 58 inwardly, thereby deflecting the forward electrode 46 to the rear. At the same time, the link 68 is pushed down to force the rear electrode forward. In this way, the work is firmly squeezed from both directions to insure good contact. After the forward electrode has been deflected a predetermined amount, a conventional switch (not shown) is activated to pass a pulse of welding current through the electrodes.

The slide block is moved down by a horizontal slide lever 90 secured at its rear end by a horizontal transverse pivot pin 92 to a block 94 mounted on the upper and rear face of the cross plate. The forward portion of the slide lever extends outwardly and terminates in a ball handle 96. The lower edge of the slide lever rests on a vertical pin 98 (FIG. 3) screwed at its lower end into the upper end of the slide block and held securely in place by a jam nut 100 threaded around it. Thus, when the slide lever is forced down to the solid line position shown in FIG. 1, the slide block is also pushed down, causing the compression spring 40 to be compressed by the lift finger 30. When the slide lever is released, the slide block moves upwardly until the lift finger engages the head of bolt 36, and slide lever is back in the phantom line position shown in FIG. 1. The downward travel of the slide block is limited by a vertical stop pin 102 screwed down through a jam nut 104 and through the horizontal portion 106 of a stop bracket 108, the upper portion of which is secured by bolts 109 to the bottom edge of the cross plate 16.

The forward travel of the forward electrode is limited by a horizontal stop screw 110 threaded through a jam nut 112 and a stop 114 secured to the lower right (as viewed in FIG. 3) forward edge of the welding head.

The base of the welder includes a locating disk 116 mounted on its upper surface to receive a work holding assembly 118 (FIG. 4), which includes a circular opening 120 in its bottom to fit over the locating disk. A longitudinal slot 122 is formed in the base and the locating disk to accommodate work of different shapes. A pair of vertical indexing pins 123 on the upper surface of the base fit into vertical bores 124 in opposite corners of the work holding assembly to orient the assembly with respect to the electrodes.

The work holding assembly includes a body 130 made up of a relatively thick first plate 132, which has the vertical bore 120 extending entirely through it. A second plate 134 is disposed on the first plate, and a third plate 136 is on the second plate. The three plates are rigidly held together by vertical dowel pins 138 which project upwardly from the top surface of the body. As shown best in FIG. 7, the third plate includes an elongated opening 139 to receive a piece of work, such as a relay header 140. For the purpose of explanation, it is assumed that the relay header has a metal base 141, and eight vertical pins 142, each extending through an insulating ceramic bushing 143.

The second plate 134 also has a central opening 144 which is similar in shape to the opening in the third plate, except that it includes inwardly extending projections 146 to form supports for the bottom of the header.

Side walls 148 are held by screws 149 to the sides of the body 130. A pair of slide plates 150 are disposed on top of the third plate 136 to make a close sliding fit on the third plate and between the side walls 148. Each slide plate includes a pair of downwardly extending pins 152, each of which extends down into the outer end of a respective longitudinal slot 154 in the top of the first plate 132 and which each terminates at its inner end in the recess 120. A pair of longitudinal tension springs 156 are disposed in the slots 154 and are connected at their opposite ends to respective pins 152 to urge the slide plates toward each other. The inward travel of each slide plate is limited by a respective stop screw 158 which extends down through a longitudinal slot 160 in each slide plate and is screwed into the first plate 132.

Each slide plate carries a block 162 on which is mounted a horizontal and longitudinally extending tongue 164. The inner end of each tongue extends over a respective half-moon opening 166 through each slide plate. Each opening opens at its forward edge through an outwardly tapered notch 168 to the inner edge of the slide plate 150. Each of the side plates is identical in construction, and the description of one will suffice for the other. The bottom of the slide plate around the opening 166 has a recess 169 (FIG. 6) to receive a shim plate 170, the bottom of which is flush with the bottom of the surrounding portion of the slide plate. The shim plate has the shape shown best in FIG. 7 to fit in the recess 169 under the opening 166 in the slide plate and to project inwardly past the inside edge of the slide plate. The inside edge of the shim plate has a notch 172 with a pair of circular recesses 174 located in the bottom of the notch to fit around respective upright posts 142 on the relay header.

FIG. 8 shows in plan view a completed relay header 140 with a pair of long spring arms 176 with loops 178 welded around respective pins 142. A separate pair of short springs 180 have loops 182 each welded to respective end pins 142 on opposite sides of the free end of the leaf springs 176.

In welding the springs in place, the slide plates are pulled apart to uncover the central opening 139, and a header is placed in the opening to rest on the projections 146. The slide plates are then released so that they move inwardly until each of the recesses 174 in the shim plates engage the outer portions of the pairs of pins at the outer end of the header as shown in FIG. 7. The long springs are then placed in the position shown in FIG. 8 so that the lower edge of each leaf spring rests on the shim plate, which supports the loop and spring above the bottom of the header to avoid the possibility of the spring dragging on the metal header base and shorting.

An elongated bridge plate 190 has a pair of vertical bores 192 at its opposite ends, and is set on the assembly body so the bores 192 fit down over the dowels 138 extending upwardly from the assembly. The bridge also includes a pair of vertical bores 194 in its center to fit down over the pins 142 in the central portion of the header. The middle portion of the bottom of the bridge is recessed at 196, and includes a longitudinal spacer 197 which fits down between the two long springs as shown in phantom line in FIG. 7 and forces each respective free end against a respective end pin on the same side of the header as the pin around which the spring is looped.

Thereafter, the assembly is set on the locating disk as shown in FIG. 1 so that the indexing pins 122 fit up into the indexing bores 124. The slide lever on the welder is pushed down to cause the electrodes to be on opposite sides of the loop on one of the long springs as shown in phantom line on FIG. 7. Thereafter, the switch lever is pressed down to force the two electrodes toward each other and against the loop. The pressure pad on the rear electrode pivots to insure that the electrode tip is firmly pressed against the loop, and the forward electrode tip is similarly pressed in firm contact with the work. As shown best in FIG. 7, the opposed portions of the electrode tips have concave recesses to fit around the loop and make good contact. As soon as the switch lever is pressed down a preset amount, the welding circuit (not shown) is fired, and the long spring is welded to the pin in the position shown in FIG. 7. Thereafter, the work assembly is picked up, rotated 180°, set back down on the welder base, and the other long spring welded to its post as just described.

The bridge is then lifted from the assembly, and the four small springs 180 are mounted on their respective posts as shown in FIG. 8. In each case, the long springs are pushed to the center to make room for the small springs. The slide plates are also retracted slightly to make room for the placement of the small springs to rest on the portion of the shim plate adjacent the tapered sides of the notch 168 in the slide plate. As shown best in FIG. 7, the shim plate in each slide plate fits closely around the outer portions of each of the end pins, and the small springs are therefore spaced above the top surface of the header. When the slide plates are released, the tapered edges of the notch 168 force the springs to rotate toward each other and against the free end of the long spring and the tongue as shown in FIG. 8 to the desired welding position. The work assembly is then placed on the welder base, using a new set of indexing pins (not shown) to locate one of the small springs under the welding electrodes. The small spring is welded to its post as before.

Thereafter, the assembly is rotated 180° and the opposite small spring is welded. The assembly is then mounted on a third set of indexing pins (not shown) on the welder base, and the remaining pair of small springs are welded. Preferably, three separate welders with only one set of indexing pins are used to avoid the possibility of inadvertently improperly indexing the assembly on the welder base.

After all the springs are welded in the position shown in FIG. 8, the slide plates are pulled outwardly, and the relay header is lifted from the assembly.

Thus, with the welder and work holder assembly of this invention, delicate metal loops are spot welded to metal posts or pins to give rugged bonds which are resistant to high temperatures.

I claim:

1. A welder comprising a frame, a welding head mounted on the frame, a pair of spaced elongated laterally deflectable electrodes mounted on the head, means for holding parts between the two electrodes, a lever pivotally mounted on the frame and disposed to engage one electrode and push the said one electrode toward the other, a link pivotally connected to the lever, cam means on the link and frame for deflecting the link toward the said other electrode when the lever is moved to push the said one electrode toward the other, a pad on the link to engage the said other electrode adjacent its end and push it toward the said one electrode, and means for passing electric current through the electrodes to weld parts together.

2. Apparatus according to claim 1 in which the pad is pivotally mounted on the link.

References Cited by the Examiner
UNITED STATES PATENTS

| 1,677,294 | 7/28 | Robertson | 269—254 |
| 1,995,368 | 3/35 | Sunnen | 219—91 |
| 2,460,807 | 2/49 | Chanowitz | 219—80 X |
| 2,645,258 | 7/53 | Blakeley | 269—254 |
| 2,706,232 | 4/55 | Pilas | 219—78 |
| 2,830,168 | 4/58 | Taylor | 219—91 |
| 2,846,561 | 8/58 | Pityo | 219—79 |
| 3,003,051 | 10/61 | Kulicke et al. | 219—78 |

FOREIGN PATENTS

| 443,437 | 2/36 | Great Britain. |

RICHARD M. WOOD, *Primary Examiner.*